US009059775B2

(12) United States Patent
Qin et al.

(10) Patent No.: US 9,059,775 B2
(45) Date of Patent: Jun. 16, 2015

(54) METHOD, DEVICE AND SYSTEM FOR RADIO FREQUENCY DEVICE PAIRING

(71) Applicant: Huawei Device Co., Ltd., Shenzhen, Guangdong (CN)

(72) Inventors: Xiaoqing Qin, Shenzhen (CN); Fei Wang, Wuhan (CN); Yanfu Lin, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 48 days.

(21) Appl. No.: 13/727,287

(22) Filed: Dec. 26, 2012

(65) Prior Publication Data

US 2013/0210357 A1    Aug. 15, 2013

(30) Foreign Application Priority Data

Feb. 10, 2012    (CN) .......................... 2012 1 0029802

(51) Int. Cl.
*H04B 7/00*    (2006.01)
*G05B 11/01*    (2006.01)
*H04B 7/26*    (2006.01)
(Continued)

(52) U.S. Cl.
CPC ................. *H04B 7/26* (2013.01); *H04W 12/06* (2013.01); *H04W 12/04* (2013.01)

(58) Field of Classification Search
USPC ............. 455/41.1, 41.2, 556.1; 370/312, 313; 725/133, 141, 153; 340/12.22, 12.23, 340/12.52
See application file for complete search history.

(56) References Cited

U.S. PATENT DOCUMENTS 8,059,573 B2 * 11/2011 Julian et al. .................. 370/312
8,112,794 B2 *  2/2012 Little et al. ....................... 726/9
(Continued)

FOREIGN PATENT DOCUMENTS

CN    101276511 A    10/2008
CN    101286265 A    10/2008
(Continued)

OTHER PUBLICATIONS

Soriente et al., "BEDA: Button-Enabled Device Pairing," Jun. 2007, Computer Science Department, University of California, Irvine, California.
(Continued)

*Primary Examiner* — Quochien B Vuong
(74) *Attorney, Agent, or Firm* — Leydig, Voit & Mayer, Ltd.

(57) ABSTRACT

A method for radio frequency device pairing includes: after a pairing instruction is received, sending a discovery request message to a second radio frequency device; receiving a discovery response message returned by the second radio frequency device; sending a first pairing request message to the second radio frequency device; receiving a first pairing response message returned by the second radio frequency device; after a button instruction entered by the user according to interface information displayed by the second radio frequency device is received, sending, to the second radio frequency device, a second pairing request message which contains button information corresponding to the button instruction; receiving a second pairing response message which is returned by the second radio frequency device and contains a confirmation result indicating that the button information and the interface information are successfully matched; exchanging keys with the target second radio frequency device, thereby completing pairing.

16 Claims, 8 Drawing Sheets

(51) Int. Cl.
*H04W 12/06* (2009.01)
*H04W 12/04* (2009.01)

(56) References Cited

U.S. PATENT DOCUMENTS

| | | | |
|---|---|---|---|
| 8,344,859 B2* | 1/2013 | Reams et al. | 340/12.22 |
| 8,544,054 B2* | 9/2013 | Reams et al. | 725/133 |
| 8,786,413 B2* | 7/2014 | Reams | 340/12.52 |
| 2007/0052547 A1 | 3/2007 | Haughawout et al. | |
| 2008/0016537 A1 | 1/2008 | Little et al. | |
| 2008/0253772 A1 | 10/2008 | Katsuyama | |
| 2011/0191833 A1 | 8/2011 | Yi et al. | |
| 2011/0289536 A1 | 11/2011 | Poder et al. | |

FOREIGN PATENT DOCUMENTS

| | | |
|---|---|---|
| CN | 101841639 A | 9/2010 |
| CN | 102136184 A | 7/2011 |
| CN | 102542768 A | 7/2012 |

OTHER PUBLICATIONS

"ZigBee RF4CE Specification, Version 1.00," Mar. 17, 2009, ZigBee Document No. 094945r00ZB, ZigBee Alliance, Inc., San Ramon, California.

Extended European Search Report in corresponding European Patent Application No. 12199575.7 (Jun. 19, 2013).

Chinese Search Report in corresponding Chinese Patent Application No. 2012100298026 (Nov. 16, 2012).

* cited by examiner

METHOD, DEVICE AND SYSTEM FOR RADIO FREQUENCY DEVICE PAIRING

CROSS-REFERENCE TO RELATED APPLICATIONS

This application claims priority to Chinese Patent Application No. 201210029802.6, filed on Feb. 10, 2012, which is hereby incorporated by reference in its entirety.

FIELD OF THE INVENTION

The present invention relates to the communications field, and in particular, to a method, a device and a system for radio frequency device pairing.

BACKGROUND OF THE INVENTION

With the development of the electronic technologies, a control means for an electronic product gradually develops from infrared radiation (Infrared Radiation, IR for short) control to radio frequency (Radio Frequency, RF for short) control. The RF control has many advantages, such as a high flexibility in operation, a bidirectional characteristic, a high flexibility in design, and a high data transmission rate. The RF4CE alliance and the ZigBee alliance (ZigBee Alliance) cooperate and jointly develop an RF4CE (Radio Frequency for Consumer Electronics, radio frequency for consumer electronics) technical standard based on ZigBee/IEEE 802.15.4 protocols, that is, a radio frequency standard for control of a household appliance. An RF4CE technology has merits of improving operational reliability, increasing a transmission distance and an anti-interference performance of a signal, making a signal be transferred without being influenced by an obstacle, and so on.

When an RF device, for example, an RF remote controller, is used, a paring operation between the RF remote controller and a controlled device needs to be performed. In the prior art, when a pairing button is not disposed on the controlled device, after the RF remote controller and the controlled device are paired, it is required to use a private message to confirm a pairing result.

As shown in FIG. 1, an existing pairing process between an RF remote controller and a controlled device includes:

S101: After receiving a pairing instruction generated by pressing a button by a user, the RF remote controller sends a discovery request message to the controlled device.

S102: The controlled device returns a discovery response message to the RF remote controller.

S103: The RF remote controller sends a pairing request message to the controlled device.

S104: The RF remote controller and the controlled device exchange keys.

S105: The controlled device returns a pairing response message to the RF remote controller.

S106: The controlled device sends a start confirmation request to the RF remote controller, and displays interface information to the user, where the interface information is prompt information that gives a prompt about a button required to be entered by the user.

S107: The user presses a corresponding button on the RF remote controller according to the interface information displayed by the controlled device, and the RF remote controller sends corresponding user button information to the controlled device.

S109: The controlled device returns a confirmation result to the RF remote controller.

In the pairing process shown in FIG. 1, pairing is performed between the RF remote controller and the controlled device through steps S101 to S105. The discovery request message, the discovery response message, the pairing request message and the pairing response message in steps S101 to S105 are all standard messages in an RF4CE standard pairing process. The pairing result is confirmed between the RF remote controller and the controlled device through steps S106 to S109, and the start confirmation request, the user button information and the confirmation result in steps S106 to S109 are all private messages, which do not meet a specification requirement of the RF4CE standard.

SUMMARY OF THE INVENTION

Embodiments of the present invention provide a method, a device and a system for radio frequency device pairing, through which pairing result confirmation which meets an RF4CE specification requirement can be performed between radio frequency devices.

In order to achieve the foregoing objectives, the embodiments of the present invention adopt the following technical solutions.

In one aspect, a method for radio frequency device pairing is provided, and includes:

after a paring instruction entered by a user is received, sending a discovery request message to at least one second radio frequency device;

receiving a discovery response message returned by the at least one second radio frequency device;

sending a first pairing request message to a target second radio frequency device in the at least one second radio frequency device;

receiving a first paring response message returned by the target second radio frequency device;

after a button instruction entered by the user according to interface information displayed by the target second radio frequency device is received, sending a second paring request message to the target second radio frequency device, where the second pairing request message contains button information corresponding to the button instruction, and the interface information is prompt information that gives a prompt about a button required to be entered by the user; and receiving a second pairing response message which is returned by the target second radio frequency device and contains a confirmation result; and if the confirmation result indicates that the button information and the interface information are successfully matched, exchanging keys with the target second radio frequency device, thereby completing pairing with the target second radio frequency device.

In one aspect, a method for radio frequency device pairing is provided, and includes:

after a discovery request message sent by a first radio frequency device is received, returning a discovery response message to the first radio frequency device;

after a first paring request message sent by the first radio frequency device is received, returning a first paring response message to the first radio frequency device, and displaying interface information, where the interface information is prompt information that gives a prompt about a button required to be entered by a user;

receiving a second pairing request message sent by the first radio frequency device, where the second pairing request message contains button information corresponding to a button instruction entered by the user according to the interface information;

if it is determined that the button information and the interface information are successfully matched, returning, to the first radio frequency device, a second pairing response message which contains a confirmation result, where the confirmation result indicates that the button information and the interface information are successfully matched; and exchanging keys with the first radio frequency device, and prompting a user end that pairing succeeds.

In one aspect, a radio frequency device is provided, and includes:

a user instruction receiving unit, configured to receive a pairing instruction entered by a user;

a discovery request sending unit, configured to, after the user instruction receiving unit receives the pairing instruction entered by the user, send a discovery request message to at least one second radio frequency device;

a discovery response receiving unit, configured to receive a discovery response message returned by the at least one second radio frequency device;

a first pairing request sending unit, configured to send a first pairing request message to a target second radio frequency device in the at least one second radio frequency device;

a first pairing response receiving unit, configured to receive a first pairing response message returned by the target second radio frequency device;

a second pairing request sending unit, configured to, after a button instruction entered by the user according to interface information displayed by the target second radio frequency device is received, send a second paring request message to the target second radio frequency device, where the second pairing request message contains button information corresponding to the button instruction, and the interface information is prompt information that gives a prompt about a button required to be entered by the user;

a second pairing response receiving unit, configured to receive a second pairing response message which is returned by the target second radio frequency device and contains a confirmation result; and a first key exchanging unit, configured to, if the confirmation result indicates that the button information and the interface information are successfully matched, exchange keys with the target second radio frequency device, thereby completing pairing with the target second radio frequency device.

In one aspect, a radio frequency device is provided, and includes:

a discovery request receiving unit, configured to receive a discovery request message sent by a first radio frequency device;

a discovery response returning unit, configured to return a discovery response message to the first radio frequency device;

a first pairing request receiving unit, configured to receive a first pairing request message sent by the first radio frequency device;

a displaying unit, configured to display interface information after the first pairing request receiving unit receives the first pairing request message sent by the first radio frequency device, where the interface information is prompt information that gives a prompt about a button required to be entered by a user;

a first pairing response returning unit, configured to return a first pairing response message to the first radio frequency device;

a second pairing request receiving unit, configured to receive a second pairing request message sent by the first radio frequency device, where the second pairing request message contains button information corresponding to a button instruction entered by the user according to the interface information;

a second pairing response returning unit, configured to, if it is determined that the button information and the interface information are successfully matched, return, to the first radio frequency device, a second pairing response message which contains a confirmation result, where the confirmation result indicates that the button information and the interface information are successfully matched; and a second key exchanging unit, configured to, after the second pairing response returning unit returns the second pairing response message which contains the confirmation result indicating that the button information and the interface information are successfully matched, exchange keys with the first radio frequency device, and prompt a user end that pairing succeeds.

In one aspect, a system for radio frequency device pairing is provided, and includes: the foregoing first radio frequency device and the foregoing second radio frequency device.

In the method, the device and the system for radio frequency device pairing which are provided in the embodiments of the present invention, pairing request messages (including the first and second pairing request messages) and pairing response messages (including the first and second pairing response messages), which meet the RF4CE specification, are used to request the pairing and confirm a pairing result, which avoids the use of a private message in the prior art and is therefore beneficial to the standardization of a radio frequency device product. For a radio frequency device without a pairing button, pairing security can also be improved.

BRIEF DESCRIPTION OF THE DRAWINGS

To illustrate technical solutions in embodiments of the present invention or in the prior art more clearly, accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

Technical solutions of embodiments of the present invention are hereinafter described clearly and completely with reference to accompanying drawings in the embodiments of the present invention. Evidently, the described embodiments are only part rather than all of the embodiments of the present invention. All other embodiments obtained by persons of ordinary skill in the art based on the embodiments of the present invention without creative efforts shall fall within the protection scope of the present invention.

Figure 1:
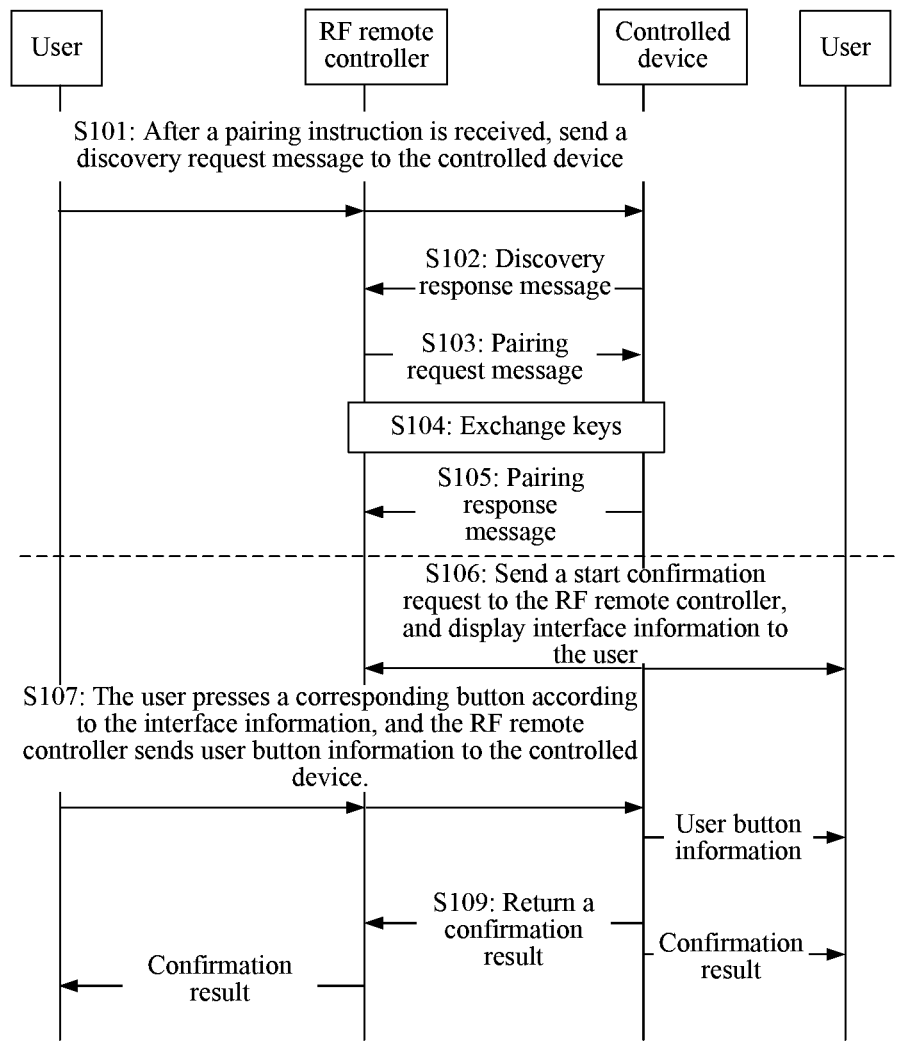
FIG. 1 is a method flow chart of a method for radio frequency remote controller pairing in the prior art.
Figure 2:
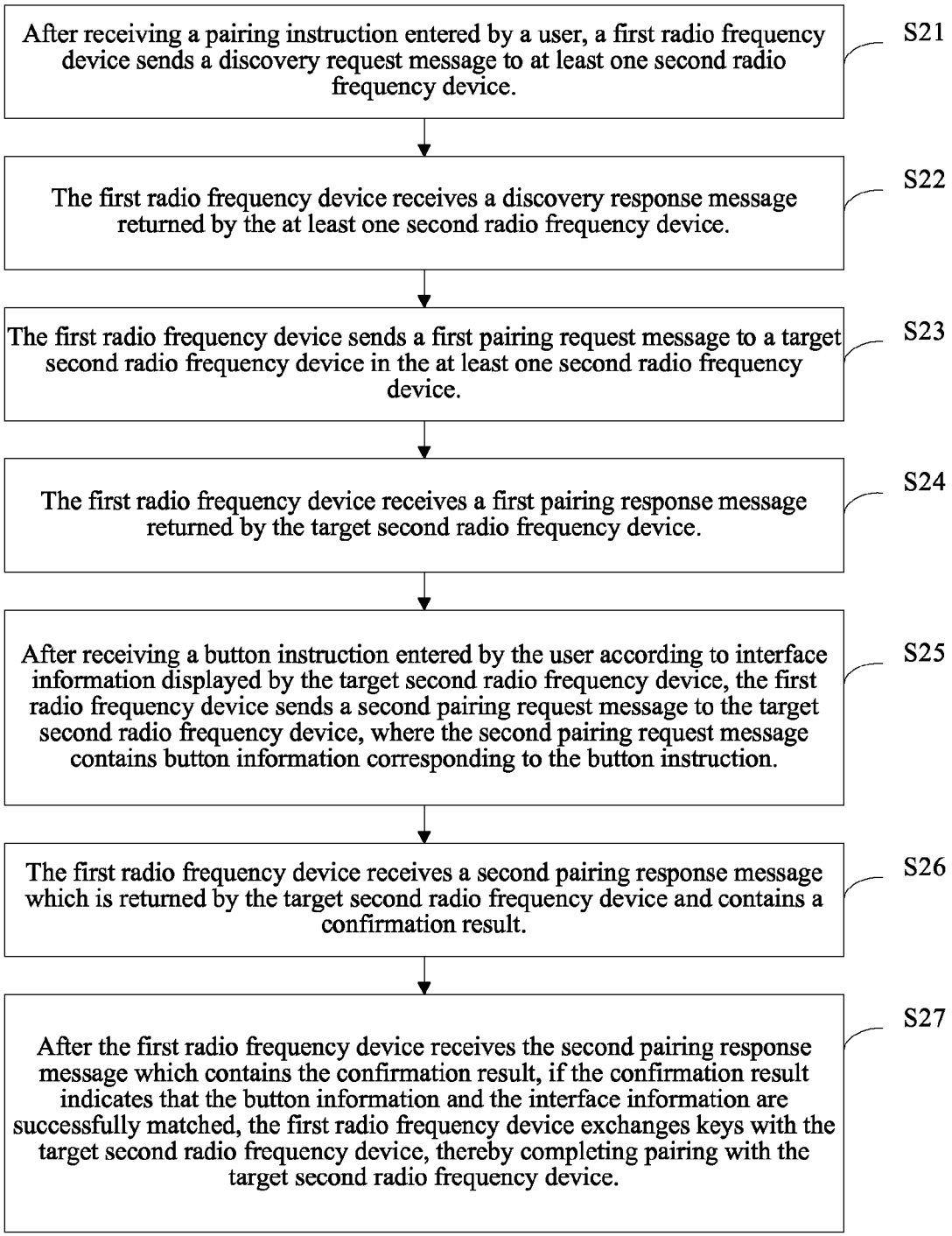
FIG. 2 is a first flow chart of a method for radio frequency device pairing according to an embodiment of the present invention.

A method for radio frequency device pairing provided in an embodiment of the present invention is shown in FIG. 2. The method includes the following steps.

S21: After receiving a paring instruction entered by a user, a first radio frequency device sends a discovery request message to at least one second radio frequency device.

After receiving the paring instruction entered by the user, the first radio frequency device sends the discovery request message to the at least one second radio frequency device in a broadcasting manner. If in a predetermined period of time the first radio frequency device does not receive a response from any second radio frequency device, the first radio frequency device may repeatedly send the discovery request message. There may be one or more second radio frequency devices. The first radio frequency device may be an RF remote controller, and the second radio frequency device may be a set top box.

S22: The first radio frequency device receives a discovery response message returned by the at least one second radio frequency device.

S23: The first radio frequency device sends a first pairing request message to a target second radio frequency device in the at least one second radio frequency device.

S24: The first radio frequency device receives a first pairing response message returned by the target second radio frequency device.

After receiving the first pairing request message sent by the first radio frequency device, the target second radio frequency device returns the first paring response message to the first radio frequency device, and displays interface information on a display interface, where the interface information is prompt information that gives a prompt about a button required to be entered by the user in a subsequent confirmation process.

S25: After receiving a button instruction entered by the user according to the interface information displayed by the target second radio frequency device, the first radio frequency device sends a second paring request message to the target second radio frequency device, where the second pairing request message contains button information corresponding to the button instruction.

After receiving the first pairing request message sent by the first radio frequency device, the target second radio frequency device returns the first paring response message to the first radio frequency device, and displays the interface information on the display interface to give a prompt about the button required to be entered by the user, and the user enters the specified button according to the prompt information.

S26: The first radio frequency device receives a second pairing response message which is returned by the target second radio frequency device and contains a confirmation result.

The confirmation result contained in the second pairing response message can indicate whether a result of matching the button information with the interface information is success or failure.

S27: After the first radio frequency device receives the second pairing response message which contains the confirmation result, and if the confirmation result indicates that the button information and the interface information are successfully matched, the first radio frequency device exchanges keys with the target second radio frequency device, thereby completing paring with the target second radio frequency device.

Further, after the first radio frequency device exchanges the keys with the target second radio frequency device, the first radio frequency device may prompt a user end that pairing succeeds, for example, the first radio frequency device may prompt, through an indicator light on it, the user end that the pairing succeeds, and may also not prompt the user end that the pairing succeeds, which is not limited in the present invention.

In the method for radio frequency device pairing provided in the embodiment of the present invention, pairing request messages (including the first and second pairing request messages) and pairing response messages (including the first and second pairing response messages), which meet the RF4CE specification, are used to request the pairing and confirm a pairing result, which avoids the use of a private message in the prior art and is beneficial to the standardization of a radio frequency device product. For a radio frequency device without a pairing button, pairing security can also be improved.

Figure 3:
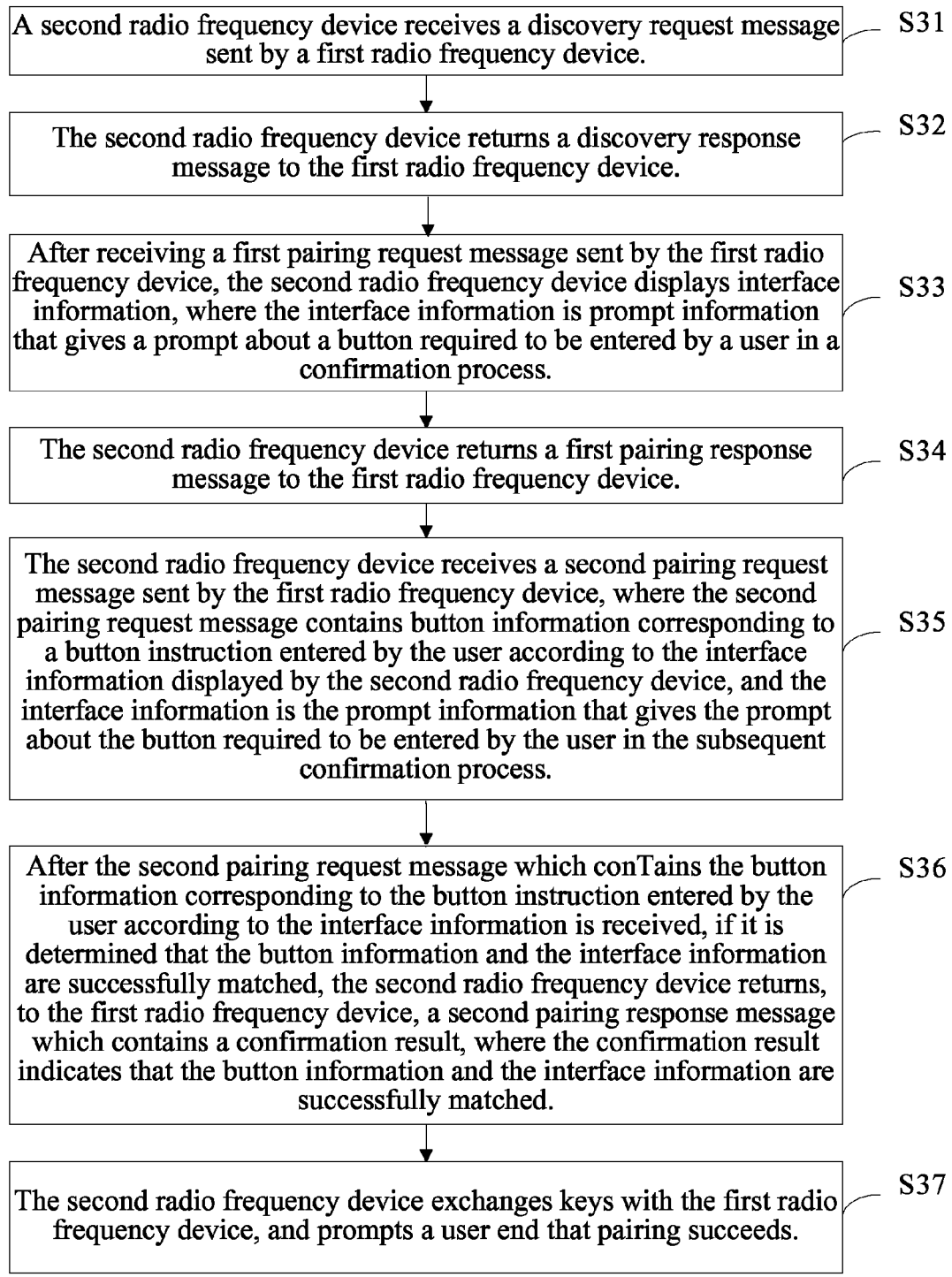
FIG. 3 is a second flow chart of a method for radio frequency device pairing according to an embodiment of the present invention.

A method for radio frequency device pairing provided in another embodiment of the present invention is shown in FIG. 3. The method includes the following steps.

S31: A second radio frequency device receives a discovery request message sent by a first radio frequency device.

There may be one or more second radio frequency devices. When there are multiple second radio frequency devices, the multiple second radio frequency devices may simultaneously receive the discovery request message sent by the first radio frequency device.

S32: The second radio frequency device returns a discovery response message to the first radio frequency device.

Specifically, after receiving the discovery request message sent by the first radio frequency device, at least one second radio frequency device returns a discovery response message to the first radio frequency device.

S33: After receiving a first pairing request message sent by the first radio frequency device, the second radio frequency device displays interface information, where the interface information is prompt information that gives a prompt about a button required to be entered by a user.

Specifically, after receiving the first pairing request message sent by the first radio frequency device, a target second radio frequency device in the at least one second radio frequency device displays interface information which contains prompt information that gives a prompt about a button required to be entered by the user in a subsequent confirmation process. It should be noted that in this embodiment, the second radio frequency device in steps S33 to S37 refers to the target second radio frequency device in the at least one second radio frequency device. When the first radio frequency device only receives a discovery response message returned by one second radio frequency device, the second radio frequency device is the target second radio frequency device. When the first radio frequency device receives discovery response messages returned by multiple second radio frequency devices, the target second radio frequency device is a second radio frequency device selected by the first radio frequency device by matching a manufacturer number of a second radio frequency device and a list of capabilities of a radio frequency device supported by the second radio frequency device, where the manufacturer number and the list are carried in each discovery response message, and the selected second radio frequency device has a manufacturer number and a list which match the first radio frequency device, and returns a discovery response message with strongest strength.

Further, after receiving the first pairing request message sent by the first radio frequency device, the target second radio frequency device displays the interface information which contains the prompt information that gives the prompt about the button required to be entered by the user in the subsequent confirmation process. The confirmation process is a part of a whole pairing process corresponding to the pairing method provided in the embodiment of the present invention. The interface information indicates that the user has already started the confirmation in the pairing process, and completes the confirmation process by performing steps S34 to S37. By starting the confirmation in the pairing process of the radio frequency devices and completing the confirmation process, mistaken pairing and an incorrect operation may be avoided in the pairing process of the radio frequency devices. In this way, a pairing flow is accelerated, and unnecessary operations are reduced.

S34: The second radio frequency device returns a first pairing response message to the first radio frequency device.

Further, the first pairing response message returned by the second radio frequency device to the first radio frequency device may contain relevant information corresponding to the interface information, and may also not contain the relevant information, which is not limited in the present invention.

The two actions of returning the first pairing response message in step S34 and displaying the interface information in step S33 both occur after the second radio frequency device receives the first paring request message sent by the first radio frequency device. The two actions may occur successively, and may also occur simultaneously. A time sequence of the two actions is not limited in the embodiment of the present invention.

S35: The second radio frequency device receives a second pairing request message sent by the first radio frequency device. The second pairing request message contains button information corresponding to a button instruction entered by the user according to the interface information displayed by the second radio frequency device, where the interface information is the prompt information that gives the prompt about the button required to be entered by the user in the subsequent confirmation process. The first radio frequency device receives the first pairing response message returned by the second radio frequency device, and after receiving the button instruction entered by the user according to the interface information displayed by the second radio frequency device, sends the second pairing request message to the second radio frequency device, where the second pairing request message contains the button information corresponding to the button instruction.

S36: After the second pairing request message which contains the button information corresponding to the button instruction entered by the user according to the interface information is received, and if it is determined that the button information and the interface information are successfully matched, the second radio frequency device returns, to the first radio frequency device, a second pairing response message which contains a confirmation result, where the confirmation result indicates that the button information and the interface information are successfully matched.

The confirmation result contained in the second pairing response message can indicate whether a result of matching the button information with the interface information is success or failure.

S37: The second radio frequency device exchanges keys with the first radio frequency device, and prompts a user end that pairing succeeds.

In the method for radio frequency device pairing provided in the embodiment of the present invention, pairing request messages (including the first and second pairing request messages) and pairing response messages (including the first and second pairing response messages), which meet the RF4CE specification, are used to request the pairing and confirm a pairing result, which is beneficial to the standardization of a radio frequency device product. For a radio frequency device without a pairing button, the pairing security can also be improved.

Figure 4:
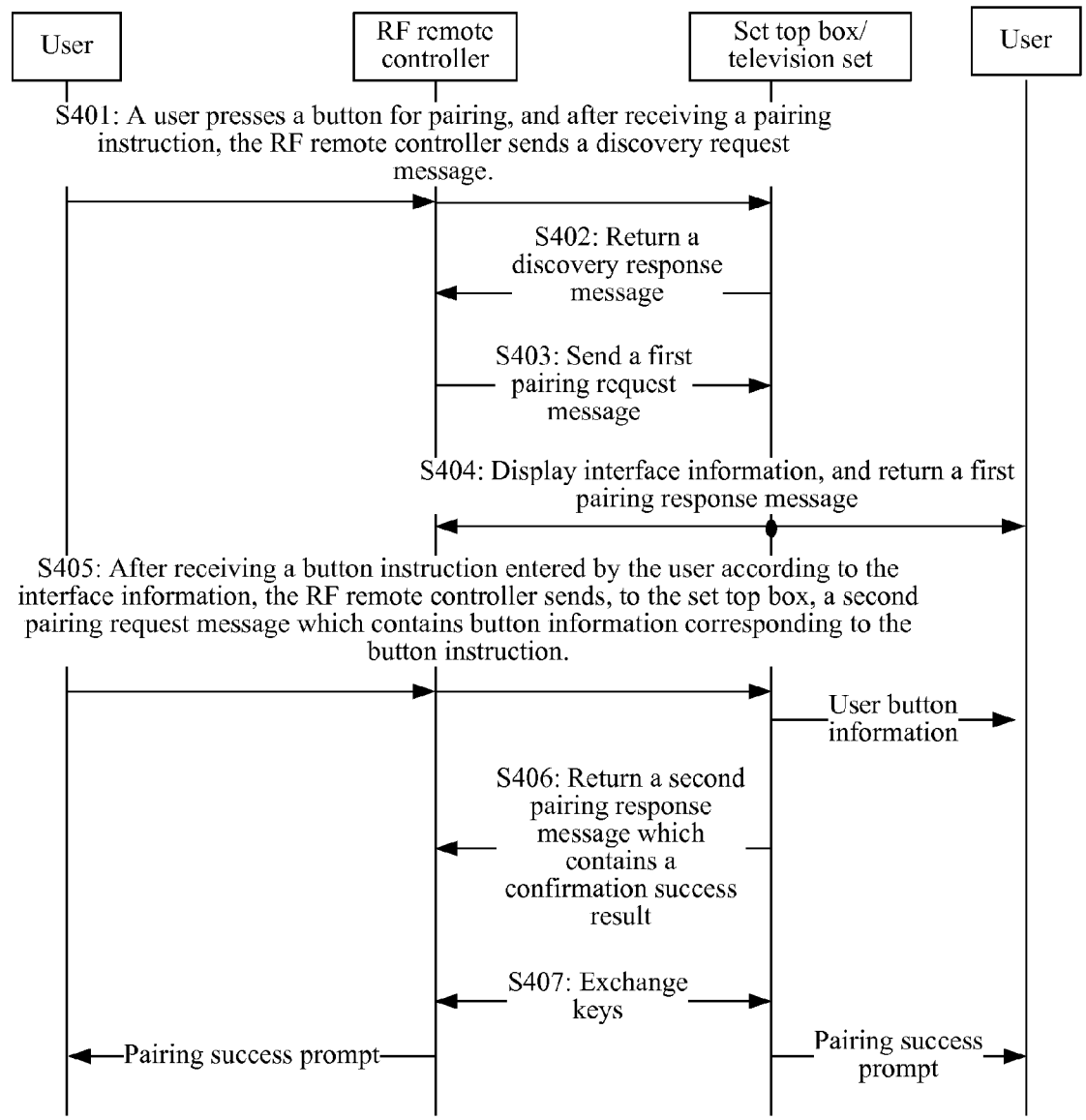
FIG. 4 is a third flow chart of a method for radio frequency device pairing according to an embodiment of the present invention.

As shown in FIG. 4, in a method for radio frequency device pairing provided in yet another embodiment of the present invention, an RF remote controller (a first radio frequency device) and a set top box (a second radio frequency device) are taken as an example for illustration. The set top box is connected to a television set, and the television set is used for displaying an interface. The method includes the following steps.

S401: A user presses a button which is for pairing and is on the RF remote controller, and after receiving a pairing instruction entered by the user, the RF remote controller sends a discovery request message to the set top box.

The RF remote controller may send the discovery request message in a broadcasting manner. In this way, multiple controlled devices within a certain scope may all receive the discovery request message. If in a predetermined period of time the RF remote controller does not receive a response returned by a controlled device, the RF remote controller may repeatedly send the discovery request message.

Optionally, the controlled device may be a set top box.

In this embodiment, it is firstly assumed that the controlled device is only one set top box, and the set top box is a target set top box.

S402: After receiving the discovery request message sent by the RF remote controller, the target set top box returns a discovery response message to the RF remote controller. Specifically, after the target set top box receives the discovery request message sent by the RF remote controller, the target set top box returns the discovery response message to the RF remote controller, so as to respond to the received discovery request message. The discovery response message sent by the target set top box may not be repeatedly sent, which is not limited in the present invention.

S403: After receiving the discovery response message returned by the target set top box, the RF remote controller sends a first pairing request message to the target set top box.

Further, when multiple devices that may be paired with the RF remote controller exist in a certain scope, after receiving the discovery request message broadcast by the RF remote controller, each device may return a discovery response message to the RF remote controller. When receiving the discovery response messages returned by the multiple devices, and by matching a manufacturer number of a device and a list of capabilities of a RF remote controller supported by the device, where the manufacturer number and the list are carried in the discovery response message returned by each device, the RF remote controller may select devices, which have manufacturer numbers of the devices matching the RF remote controller, as candidate devices, and then from the candidate devices, select a device, which has a list matching the capability of the RF remote controller and has a discovery response message with strongest signal strength, as a target device for pairing, and perform steps S403 to S408.

S404: After receiving the first pairing request message sent by the RF remote controller, the target set top box displays interface information through the television set, where the interface information is prompt information that gives a prompt about a button required to be entered by the user: and returns a first pairing response message to the RF remote controller.

In this step, the television set may display button information which is required to be entered by the user through the RF remote controller and is used for performing matching confirmation, and so on.

Further, in this step, after returning the first pairing response message to the RF remote controller, the target set top box may start a timer, and if a second pairing request message which is sent by the RF remote controller and contains button information corresponding to a button instruction is not received in a predetermined period of time, exits a pairing process. In this way, the robustness of a system may be increased, and an incorrect operation of the user may be effectively processed.

S405: After receiving the first pairing response message returned by the target set top box, and after receiving a button instruction entered by the user according to the interface information displayed by the television set, the RF remote controller sends a second pairing request message to the target set top box, where the second pairing request message contains button information corresponding to the button instruction.

Specifically, after seeing button information displayed by the television set, the user presses a corresponding button instruction, where the button instruction may be a number button, a direction button, a function button or the like on the remote controller. After receiving the button instruction entered by the user according to a display interface of the television set, the RF remote controller sends, to the target set top box, the second pairing request message which contains the button information corresponding to the button instruction.

Further, in this step, when the RF remote controller sends, to the target set top box, the second pairing request message which contains the button information corresponding to the button instruction, the RF remote controller and the target set top box may use a simple window mechanism at a link layer to ensure sequential reliable transmission of the button information, so as to prevent the occurrence of excessive abnormal situations.

In addition, in this step, after receiving the first pairing response message returned by the target set top box, the RF controller may also start a timer, and if in a predetermined period of time the RF remote controller does not receive the button instruction entered by the user, exits the pairing process. In this way, the robustness of the system may be increased, and an incorrect operation of the user may be effectively processed.

S406: After receiving the second pairing request message which is sent by the RF remote controller and contains the button information corresponding to the button instruction, the target set top box performs matching confirmation on the button information. If the target set top box determines that the button information and the interface information are successfully matched, a second pairing response message which contains a confirmation success result is returned to the RF remote controller, where the confirmation success result indicates that the button information and the interface information are successfully matched; and step S407 is performed, where the confirmation success result may be a successful confirmation message.

When the target set top box determines that the button information and the interface information are successfully matched, a second pairing response message which contains a confirmation result is returned to the RF remote controller, where the confirmation result indicates that the button information and the interface information are successfully matched, and may be referred to as a confirmation success result.

FIG. 4 only schematically shows a situation of successful confirmation. When the confirmation fails, steps S406 and S407 in the drawing may be substituted with the following content: If the target set top box determines that the button information and the interface information are not matched, a second pairing response message which contains a confirmation failure message is returned to the RF remote controller, and step S408 is performed.

In addition, if the target set top box receives, after step S403, the first pairing request message sent by the RF remote controller, and if it is determined that pairing information of the RF remote controller is already stored in the target set top box, a second pairing response message which contains a confirmation result is directly returned to the RF remote controller, where the confirmation result indicates that pairing succeeds; keys are exchanged with the RF remote controller; and a user end is prompted that the pairing succeeds. In this way, steps S404 and S405 may be omitted, thereby accelerating the pairing process.

S407: The RF remote controller exchanges the keys with the target set top box. After exchanging the keys, the target set top box may prompt the user end that the pairing succeeds. For example, information prompting that the pairing succeeds is displayed by the television set connected to the target set top box. After the RF remote controller receives the second pairing response message which is returned by the target set top box and contains the confirmation result, and if the confirmation result indicates that the button information and the interface information are successfully matched, the RF remote controller exchanges the keys with the target set top box, thereby completing the pairing with the target set top box.

It should be noted that in the embodiment of the present invention, after the RF remote controller exchanges the keys with the target set top box, the RF remote controller may prompt the user end that the pairing succeeds, and for example, prompt, through an indicator light on the remote controller, the user end that the pairing succeeds; and may also not prompt the user end that the pairing succeeds, which is not limited in the present invention.

In addition, after the RF remote controller sends the first pairing request message to the target set top box, if the target set top box determines that the pairing information of the RF remote controller is already stored, the target set top box directly returns, to the RF remote controller, the second pairing response message which contains the confirmation result, where the confirmation result indicates that the pairing succeeds, and the RF remote controller exchanges the keys with the target set top box, and prompts the user end that the pairing succeeds. After the RF remote controller and the target set top box successfully perform pairing once, the pairing information corresponding to the RF remote controller may be stored in the target set top box. Subsequently, every time the RF remote controller and the target set top box perform pairing, after the RF remote controller sends the first pairing request message to the target set top box, if the target set top box finds that the pairing information of the RF remote controller is already stored, the second pairing response message which contains the confirmation result indicating that the pairing succeeds is directly sent to the remote controller, the keys are exchanged with the remote controller, and the user end is prompted that the pairing succeeds, thereby simplifying the pairing process. The pairing information of the RF remote controller includes information such as address information and a pairing reference of the RF remote controller, and may further include other corresponding pairing information. As the pairing information of the RF remote controller in the embodiment of the present invention is pairing information in the prior art, details are not described again in the embodiment of the present invention. In this scenario, the pairing process is simplified, and this scenario may occur in every pairing process of the RF remote controller and the target set top box after the RF remote controller and the target set top box successfully perform pairing once.

It should be noted that the RF remote controller sends, to the set top box and according to the interface information displayed by the television set, the second pairing request message which contains the button information corresponding to the button instruction entered by the user according to the interface information, and after receiving the second pairing request message which is sent by the RF remote controller and contains the button information corresponding to the button instruction entered by the user according to the interface information, the set top box returns, to the RF remote controller, the second pairing response message which contains the confirmation success result. In the process, sending may be repeated several times before the set top box determines that a sent confirmation result indicates that the button information is correct. Information sending between each other is not stopped until the set top box determines that the sent confirmation result indicates that the button information and the interface information are successfully matched.

S408: After receiving the second pairing response message which is returned by the target set top box and contains the confirmation failure message, the RF remote controller stops exchanging keys, and exits the pairing process.

It should be noted that the RF remote controller and the set top box are taken as an example for illustration in this embodiment, and the method provided in this embodiment is not limited to it, and is also applicable to a pairing process between other radio frequency devices, such as radio frequency cluster machines.

In the method for radio frequency device pairing provided in the embodiment of the present invention, pairing request messages (including the first and second pairing request messages) and pairing response messages (including the first and second pairing response messages), which meet the RF4CE specification, are used to request the pairing and confirm a pairing result, which avoids the use of a private message in the prior art and is beneficial to the standardization of a radio frequency device product. For a radio frequency device without a pairing button, pairing security can also be improved.

Figure 5:
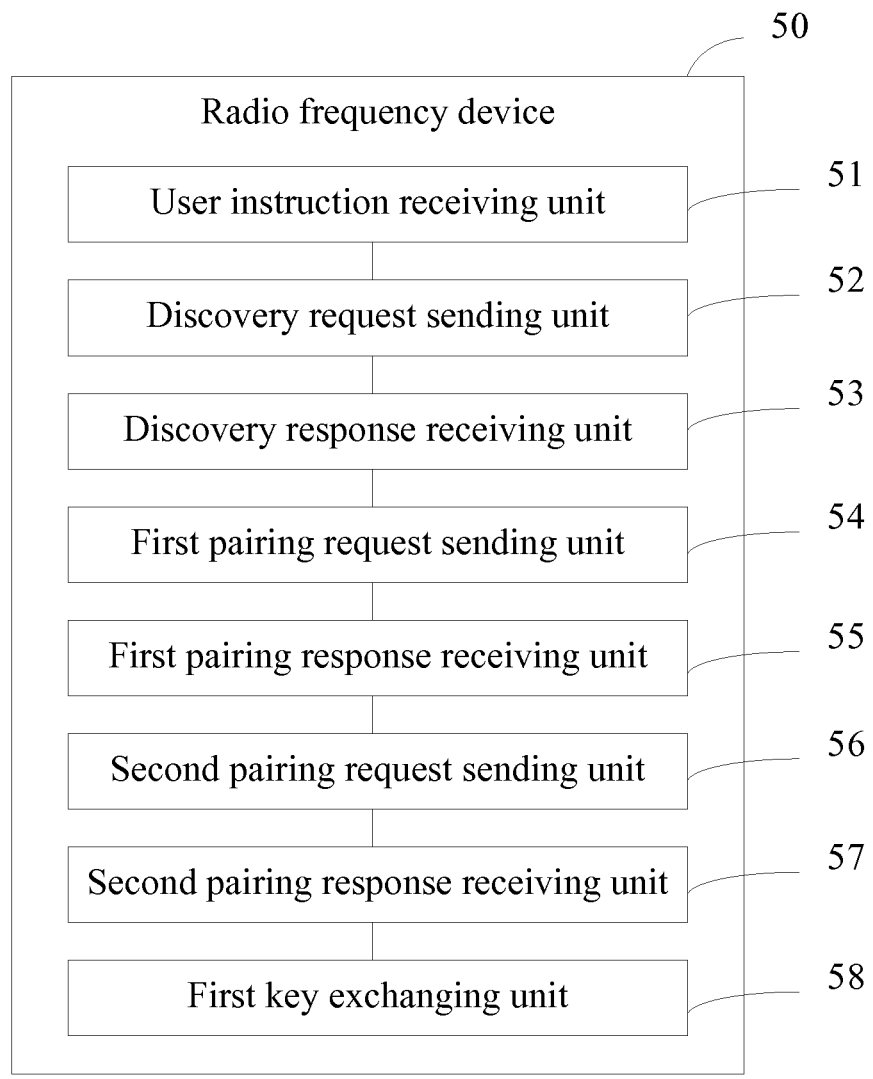
FIG. 5 is a schematic structural diagram of a radio frequency device side according to an embodiment of the present invention.

A radio frequency device 50 provided in an embodiment of the present invention corresponds to the foregoing method embodiment. Each function unit of the radio frequency device may be used in the steps of the foregoing method. As shown in FIG. 5, the radio frequency device 50 includes:

a user instruction receiving unit 51, configured to receive a pairing instruction entered by a user;

a discovery request sending unit 52, configured to, after the user instruction receiving unit 51 receives the pairing instruction entered by the user, send a discovery request message to at least one second radio frequency device;

a discovery response receiving unit 53, configured to receive a discovery response message returned by the at least one second radio frequency device;

a first pairing request sending unit 54, configured to send a first pairing request message to a target second radio frequency device in the at least one second radio frequency device;

a first pairing response receiving unit 55, configured to receive a first pairing response message returned by the target second radio frequency device;

a second pairing request sending unit 56, configured to, after a button instruction entered by the user according to interface information displayed by the target second radio frequency device is received, send a second paring request message to the target second radio frequency device, where the second pairing request message contains button information corresponding to the button instruction, and the interface information is prompt information that gives a prompt about a button required to be entered by the user;

a second pairing response receiving unit 57, configured to receive a second pairing response message which is returned by the target second radio frequency device and contains a confirmation result; and a first key exchanging unit 58, configured to, if the confirmation result indicates that the button information and the interface information are successfully matched, exchange keys with the target second radio frequency device, and prompt a user end that pairing succeeds.

In the radio frequency device provided in the embodiment of the present invention, pairing request messages (including the first and second pairing request messages) and pairing response messages (including the first and second pairing response messages), which meet the RF4CE specification, are used to request the pairing and confirm a pairing result, which avoids the use of a private message in the prior art and is beneficial to the standardization of a radio frequency device product. For a radio frequency device without a pairing button, pairing security can also be improved.

Figure 6:
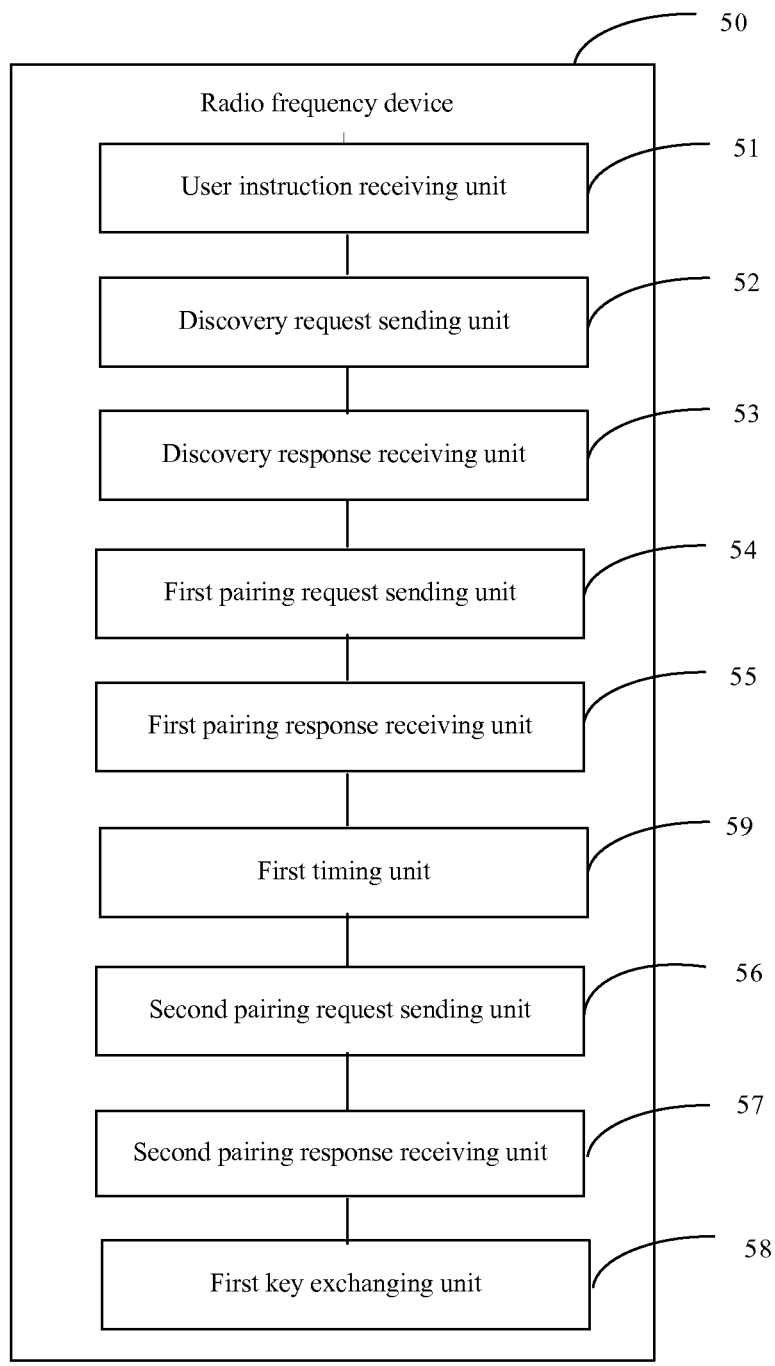
FIG. 6 is a schematic structural diagram of another radio frequency device side according to an embodiment of the present invention.

Further, as shown in FIG. 6, the radio frequency device 50 further includes:

a first timing unit 59, configured to start after the first pairing response message returned by the target second radio frequency device is received, where a pairing process is exited if the button instruction entered by the user is not received in a predetermined period of time. In this way, the robustness of the system may be increased, and an incorrect operation of the user may be effectively processed.

The radio frequency device 50 may be a first radio frequency device. The discovery response receiving unit 53 is further configured to, when there are multiple second radio frequency devices, and when discovery response messages returned by the multiple second radio frequency devices are received, select a second radio frequency device as the target second radio frequency device by matching a manufacturer number of a second radio frequency device and a list of capabilities of a radio frequency device supported by the second radio frequency device, where the manufacturer number and the list are carried in each discovery response message, and the selected second radio frequency device has a manufacturer number and a list of capabilities which match the first radio frequency device, and returns a discovery response message with strongest strength.

The second pairing response receiving unit 57 is further configured to, after the first pairing request sending unit 54 sends the first pairing request message to the target second radio frequency device in the at least one second radio frequency device, receive a second pairing response message which is returned by the target second radio frequency device and contains a confirmation result, where the confirmation result indicates that the pairing succeeds.

The first key exchanging unit 58 is further configured to, after the second pairing response receiving unit 57 receives the second pairing response message which contains the confirmation result indicating that the pairing succeeds, exchange the keys with the target second radio frequency device, and prompt the user end that the pairing succeeds.

Figure 7:
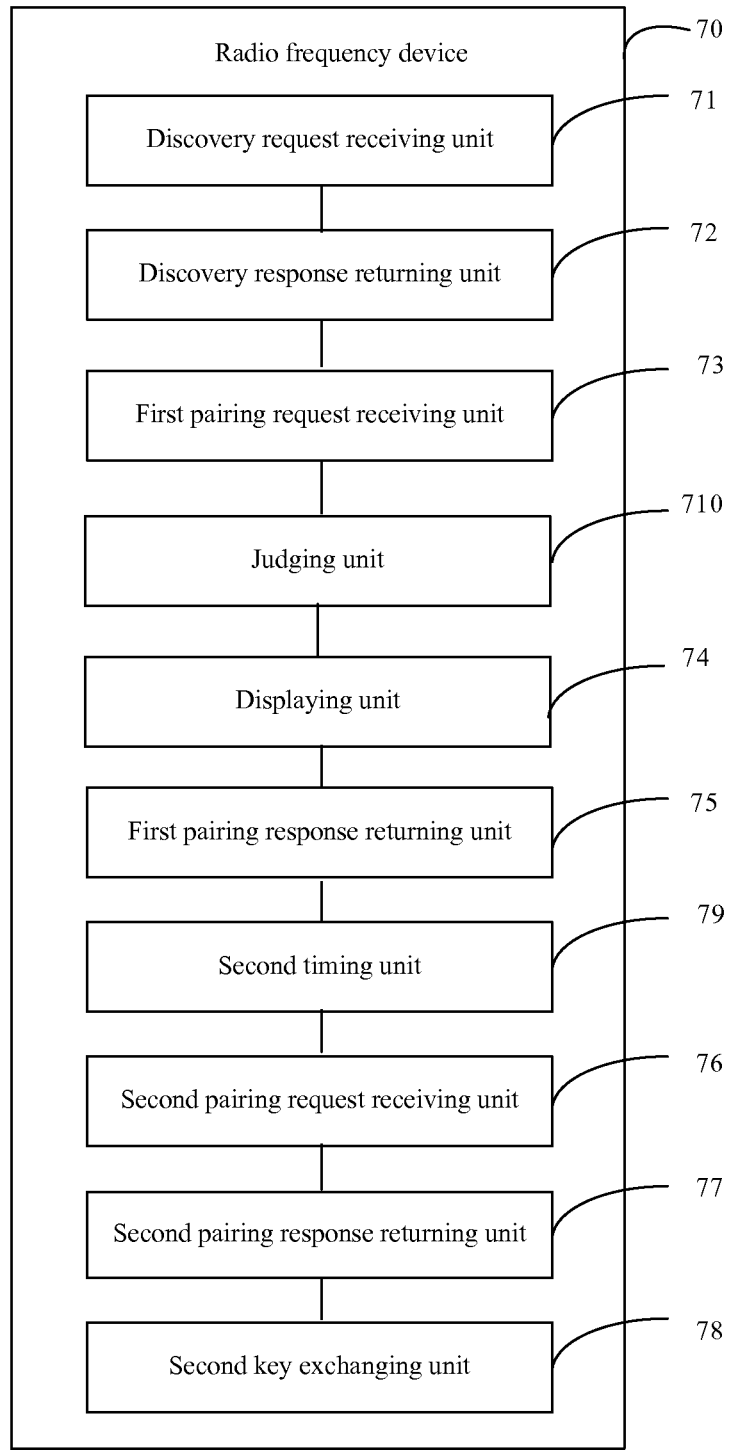
FIG. 7 is a schematic structural diagram of a radio frequency device side according to an embodiment of the present invention.

A radio frequency device 70 provided in another embodiment of the present invention corresponds to the foregoing method embodiment. Each function unit of the radio frequency device may be used in the steps of the foregoing method. As shown in FIG. 7, the radio frequency device 70 includes:

A discovery request receiving unit 71 is configured to receive a discovery request message sent by a first radio frequency device.

A discovery response returning unit 72 is configured to return a discovery response message to the first radio frequency device.

A first pairing request receiving unit 73 is configured to receive a first pairing request message sent by the first radio frequency device.

A displaying unit 74 is configured to display interface information after the first pairing request receiving unit 73 receives the first pairing request message sent by the first radio frequency device, where the interface information is prompt information that gives a prompt about a button required to be entered by a user.

A first pairing response returning unit 75 is configured to return a first pairing response message to the first radio frequency device, and is specifically configured to, after the first pairing request receiving unit 73 receives the first pairing request message sent by the first radio frequency device, return the first pairing response message to the first radio frequency device.

The two actions of interface information displaying of the displaying unit 74 and first pairing response message returning of the first pairing response returning unit 75 both occur after the first pairing request receiving unit 73 receives the first paring request message sent by the first radio frequency device. The two actions may occur successively, and may also occur simultaneously. A time sequence of the two actions is not limited in the embodiment of the present invention.

A second pairing request receiving unit 76 is configured to receive a second pairing request message sent by the first radio frequency device, where the second pairing request message contains button information corresponding to a button instruction entered by the user according to the interface information.

A second pairing response returning unit 77 is configured to, if it is determined that the button information and the interface information are successfully matched, return, to the first radio frequency device, a second pairing response message which contains a confirmation result, where the confirmation result indicates that the button information and the interface information are successfully matched.

A second key exchanging unit 78 is configured to, after the second pairing response returning unit 77 returns the second pairing response message which contains the confirmation result indicating that the button information and the interface information are successfully matched, exchange keys with the first radio frequency device, and prompt a user end that pairing succeeds.

In the radio frequency device provided in the embodiment of the present invention, pairing request messages (including the first and second pairing request messages) and pairing response messages (including the first and second pairing response messages), which meet the RF4CE specification, are used to request the pairing and confirm a pairing result, which avoids the use of a private message in the prior art and is beneficial to the standardization of a radio frequency device product. For a radio frequency device without a pairing button, pairing security can also be improved.

Further, as shown in FIG. 7, the radio frequency device 70 further includes:

a second timing unit 79 is configured to start after the first pairing response returning unit 75 returns the first pairing response message to the first radio frequency device, where the pairing flow is exited if in a predetermined period of time the second pairing request receiving unit 76 does not receive the second pairing request message which is sent by the first radio frequency device and contains the button information corresponding to the button instruction entered by the user according to the interface information. In this way, the robustness of the system may be increased, and an incorrect operation of the user may be effectively processed.

Further, as shown in FIG. 7, the radio frequency device 70 further includes:

a judging unit 710 is configured to, after the first paring request receiving unit 73 receives the first pairing request message sent by the first radio frequency device, judge whether the radio frequency device stores pairing information of the first radio frequency device. The displaying unit 74 is further configured to display the interface information, after the first pairing request receiving unit 73 receives the first pairing request message sent by the first radio frequency device, and when the judging unit 710 judges that the radio frequency device does not store the pairing information of the first radio frequency device. The first pairing response returning unit 75 is further configured to, after the first pairing request receiving unit 73 receives the first pairing request message sent by the first radio frequency device, and when the judging unit 710 judges that the radio frequency device does not store the pairing information of the first radio frequency device, return the first pairing response message to the first radio frequency device.

Figure 8:
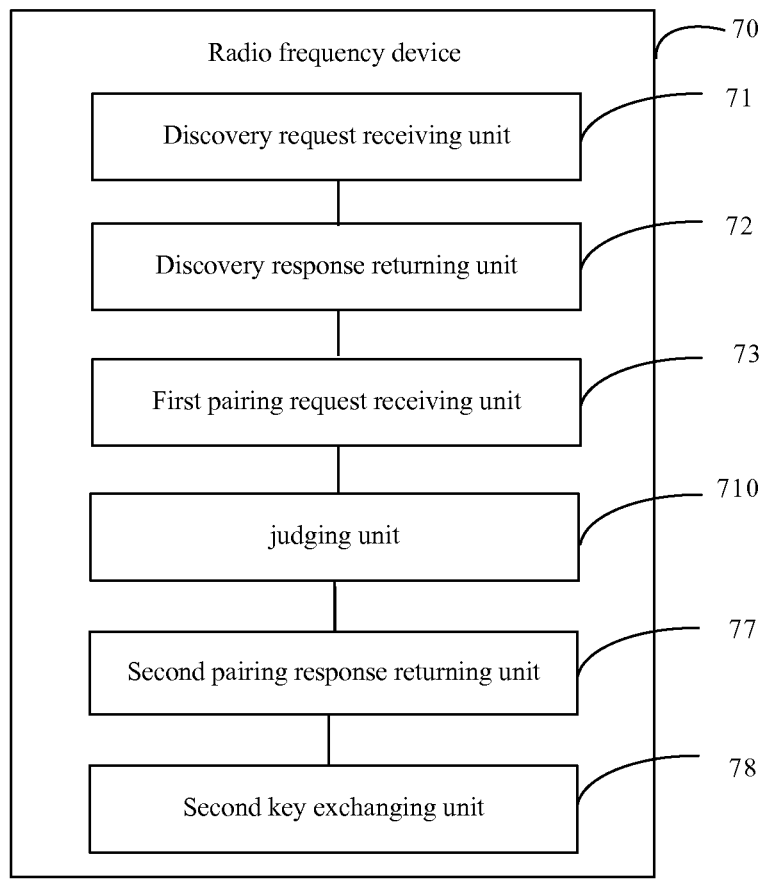
FIG. 8 is a schematic structural diagram of another radio frequency device side according to an embodiment of the present invention.

In an embodiment of the present invention, as shown in FIG. 8, the second pairing response returning unit 77 is further configured to, when the judging unit 710 judges that the radio frequency device stores the pairing information of the first radio frequency device, return, to the first radio frequency device, a second pairing response message which contains a confirmation result, where the confirmation result indicates that the pairing succeeds.

The second key exchanging unit 78 is further configured to, after the second pairing response returning unit 77 returns the second pairing response message which contains the confirmation result indicating that the pairing succeeds, exchange the keys with the first radio frequency device, and prompt the user end that the pairing succeeds. In this way, the pairing process is accelerated.

Figure 9:
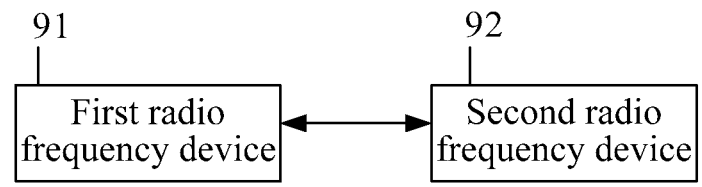
FIG. 9 is a schematic structural diagram of a system for radio frequency device pairing according to an embodiment of the present invention.

A system for radio frequency device pairing provided in an embodiment of the present invention corresponds to the foregoing method embodiment and device embodiment. As shown in FIG. 9, the system includes:

A first radio frequency device 91 is configured to, after a pairing instruction entered by a user is received, send a discovery request message to at least one second radio frequency device 92; receive a discovery response message returned by the at least one second radio frequency device 92; send a first pairing request message to a target second radio frequency device 92 in the at least one second radio frequency device 92; receive a first pairing response message returned by the target second radio frequency device 92; after a button instruction entered by the user according to interface information displayed by the target second radio frequency device 92 is received, send a second pairing request message to the target second radio frequency device 92, where the second pairing request message contains button information corresponding to the button instruction; receive a second pairing response message which is returned by the target second radio frequency device 92 and contains a confirmation result; if the confirmation result indicates that the button information and the interface information are successfully matched, exchange keys with the target second radio frequency device 92, and prompt a user end that pairing succeeds.

A second radio frequency device 92 is configured to, after receiving the discovery request message sent by the first radio frequency device 91, return the discovery response message to the first radio frequency device 91; after receiving the first paring request message sent by the first radio frequency device 91, return the first pairing response message to the first radio frequency device 91, and display the interface information, where the interface information is prompt information that gives a prompt about a button required to be entered by the user; receive the second pairing request message sent by the first radio frequency device 91, where the second pairing request message contains the button information corresponding to the button instruction entered by the user according to the interface information, and the interface information is the prompt information that gives the prompt about the button required to be entered by the user; if it is determined that the button information and the interface information are successfully matched, return, to the first radio frequency device 91, the second pairing response message which contains the confirmation result, where the confirmation result indicates that the button information and the interface information are successfully matched; and exchange the keys with the first radio frequency device 91, and prompt the user end that the pairing succeeds.

Further, a specific structure of the foregoing first radio frequency device 91 is the same as the structure of the radio frequency device 50 provided in the foregoing embodiment, and a specific structure of the second radio frequency device 92 is the same as the structure of the radio frequency device 70 provided in the foregoing embodiment, which are not described in detail herein again. Each function unit of each radio frequency device of the system may be used in the steps of the methods in the foregoing method embodiment.

In the system for radio frequency device pairing provided in the embodiment of the present invention, pairing request messages (including the first and second pairing request messages) and pairing response messages (including the first and second pairing response messages), which meet the RF4CE specification, are used to request the pairing and confirm a pairing result, which avoids the use of a private message in the prior art and is beneficial to the standardization of a radio frequency device product. For a radio frequency device without a pairing button, pairing security can also be improved.

It should be noted that, in this document, relationship terms such as first and second are merely used to distinguish an entity or operation from another entity or operation, but do not require or imply any actual relationship or sequence between these entities or operations.

The above descriptions are merely specific implementations of the present invention, but not intended to limit the protection scope of the present invention. Any modification, variation or replacement that can be easily derived by those skilled in the art within the technical scope disclosed in the present invention shall fall within the protection scope of the present invention. Therefore, the protection scope of the present invention is subject to the protection scope of the claims.

What is claimed is:

1. A method for radio frequency device pairing, comprising:
   after a paring instruction entered by a user is received, sending a discovery request message to at least one second radio frequency device;
   receiving a discovery response message returned by the at least one second radio frequency device;
   sending a first pairing request message which meets requirements of Radio Frequency for Consumer Electronics (RF4CE) standard, to a target second radio frequency device in the at least one second radio frequency device;
   receiving a first paring response message which meets the requirements of the RF4CE standard, returned by the target second radio frequency device;
   after a button instruction entered by the user according to interface information displayed by the target second radio frequency device is received, sending a second paring request message which meets the requirements of the RF4CE standard, to the target second radio frequency device, wherein the second pairing request message contains button information corresponding to the button instruction, and the interface information is prompt information that gives a prompt about a button required to be entered by the user; and
   receiving a second pairing response message which meets the requirements of the RF4CE standard, and is returned by the target second radio frequency device and contains a confirmation result; and if the confirmation result indicates that the button information and the interface information are successfully matched, exchanging keys with the target second radio frequency device, thereby completing pairing with the target second radio frequency device.

2. The method according to claim 1, wherein after receiving the first pairing response message returned by the target second radio frequency device, the method further comprises:
   starting a timer, and if the button instruction entered by the user is not received in a predetermined period of time, exiting a pairing process.

3. The method according to claim 1, wherein when there are multiple second radio frequency devices, after discovery response messages returned by the multiple second radio frequency devices are received, the method further comprises a step of determining the target second radio frequency device, which comprises selecting a second radio frequency device as the target second radio frequency device by matching a manufacturer number of the second radio frequency device and a list of capabilities of a radio frequency device supported by the second radio frequency device, wherein the manufacturer number and the list are carried in each discovery response message, and the selected second radio frequency device has the manufacturer number and a list which match a first radio frequency device, and returns a discovery response message with strongest strength, and the first radio frequency device is a radio frequency device that performs pairing with the at least one second radio frequency device.

4. The method according to claim 1, further comprising:
   after the first pairing request message is sent to the target second radio frequency device in the at least one second radio frequency device, and if the second pairing response message which is returned by the target second radio frequency device and contains the confirmation result is received, and the confirmation result indicates that the pairing succeeds, exchanging the keys with the target second radio frequency device, thereby completing the pairing with the target second radio frequency device.

5. A method for radio frequency device pairing, comprising:
 after a discovery request message sent by a first radio frequency device is received, returning a discovery response message to the first radio frequency device;
 after a first paring request message which meets requirements of Radio Frequency for Consumer Electronics (RF4CE) standard, sent by the first radio frequency device is received, returning a first paring response message which meets the requirements of the RF4CE standard, to the first radio frequency device, and displaying interface information, wherein the interface information is prompt information that gives a prompt about a button required to be entered by a user;
 receiving a second pairing request message which meets the requirements of the RF4CE standard, sent by the first radio frequency device, wherein the second pairing request message contains button information corresponding to a button instruction entered by the user according to the interface information;
 if it is determined that the button information and the interface information are successfully matched, returning, to the first radio frequency device, a second pairing response message which meets the requirements of the RF4CE standard, and contains a confirmation result, wherein the confirmation result indicates that the button information and the interface information are successfully matched; and
 exchanging keys with the first radio frequency device, and prompting a user end that a pairing process succeeds.

6. The method according to claim 5, wherein after returning the first pairing response message to the first radio frequency device, the method further comprises:
 starting a timer, and if the second pairing request message which is sent by the first radio frequency device and contains the button information corresponding to the button instruction entered by the user according to the interface information is not received in a predetermined period of time, exiting the pairing process.

7. The method according to claim 5, wherein after the first pairing request message sent by the first radio frequency device is received, the method further comprises:
 if it is determined that a second radio frequency device stores pairing information of the first radio frequency device, returning, to the first radio frequency device, a second pairing response message which contains a confirmation result, wherein the confirmation result indicates that the pairing process succeeds, exchanging the keys with the first radio frequency device, and prompting the user end that the pairing process succeeds, wherein the second radio frequency device performs the pairing process with the first radio frequency device,
 wherein the pairing information corresponds to the first radio frequency device and is stored in the second radio frequency device after the second radio frequency device and the first radio frequency device successfully perform the pairing process once.

8. A radio frequency device, comprising:
 a user instruction receiving unit, configured to receive a pairing instruction entered by a user;
 a discovery request sending unit, configured to, after the user instruction receiving unit receives the pairing instruction entered by the user, send a discovery request message to at least one second radio frequency device;
 a discovery response receiving unit, configured to receive a discovery response message returned by the at least one second radio frequency device;
 a first pairing request sending unit, configured to send a first pairing request message which meets requirements of Radio Frequency for Consumer Electronics (RF4CE) standard to a target second radio frequency device in the at least one second radio frequency device;
 a first pairing response receiving unit, configured to receive a first pairing response message which meets the requirements of the RF4CE standard returned by the target second radio frequency device;
 a second pairing request sending unit, configured to, after a button instruction entered by the user according to interface information displayed by the target second radio frequency device is received, send a second paring request message which meets the requirements of the RF4CE standard, to the target second radio frequency device, wherein the second pairing request message contains button information corresponding to the button instruction, and the interface information is prompt information that gives a prompt about a button required to be entered by the user;
 a second pairing response receiving unit, configured to receive a second pairing response message which meets the requirements of the RF4CE standard, and is returned by the target second radio frequency device and contains a confirmation result; and
 a key exchanging unit, configured to, if the confirmation result indicates that the button information and the interface information are successfully matched, exchange keys with the target second radio frequency device, thereby completing a pairing process with the target second radio frequency device.

9. The radio frequency device according to claim 8, further comprising:
 a timing unit, configured to start timing after the first pairing response message returned by the target second radio frequency device is received, wherein the pairing process is ended if the button instruction entered by the user is not received in a predetermined period of time.

10. The radio frequency device according to claim 8, wherein the radio frequency device is a first radio frequency device, and the discovery response receiving unit is further configured to, when there are multiple second radio frequency devices, and when discovery response messages returned by the multiple second radio frequency devices are received, select a second radio frequency device as the target second radio frequency device by matching a manufacturer number of the second radio frequency device and a list of capabilities of a radio frequency device supported by the second radio frequency device, wherein the manufacturer number and the list are carried in each discovery response message, and the selected second radio frequency device has a manufacturer number and a list which match the first radio frequency device, and returns a discovery response message with strongest strength.

11. The radio frequency device according to claim 8, wherein the second pairing response receiving unit is further configured to, after the first pairing request sending unit sends the first pairing request message to the target second radio frequency device in the at least one second radio frequency device, receive the second pairing response message which is returned by the target second radio frequency device and contains the confirmation result, wherein the confirmation result indicates that the pairing process succeeds; and the key exchanging unit is further configured to, after the second pairing response receiving unit receives the second pairing response message which contains the confirmation result indicating that the pairing process succeeds, exchange the keys with the target second radio frequency device, thereby completing the pairing process with the target second radio frequency device.

12. A radio frequency device, comprising:
a discovery request receiving unit, configured to receive a discovery request message sent by a first radio frequency device;
a discovery response returning unit, configured to return a discovery response message to the first radio frequency device;
a first pairing request receiving unit, configured to receive a first pairing request message which meets requirements of Radio Frequency for Consumer Electronics (RF4CE) standard, sent by the first radio frequency device;
a displaying unit, configured to display interface information after the first pairing request receiving unit receives the first pairing request message sent by the first radio frequency device, wherein the interface information is prompt information that gives a prompt about a button required to be entered by a user;
a first pairing response returning unit, configured to return a first pairing response message which meets the requirements of the RF4CE standard, to the first radio frequency device;
a second pairing request receiving unit, configured to receive a second pairing request message which meets the requirements of the RF4CE standard, sent by the first radio frequency device, wherein the second pairing request message contains button information corresponding to a button instruction entered by the user according to the interface information;
a second pairing response returning unit, configured to, if it is determined that the button information and the interface information are successfully matched, return, to the first radio frequency device, a second pairing response message which meets the requirements of the RF4CE standard, and contains a confirmation result, wherein the confirmation result indicates that the button information and the interface information are successfully matched; and
a key exchanging unit, configured to, after the second pairing response returning unit returns the second pairing response message which contains the confirmation result indicating that the button information and the interface information are successfully matched, exchange keys with the first radio frequency device, and prompt a user end that a pairing process succeeds.

13. The radio frequency device according to claim 12, further comprising:
a timing unit, configured to start timing after the first pairing response returning unit returns the first pairing response message to the first radio frequency device, wherein a pairing process is ended if in a predetermined period of time the second pairing request receiving unit does not receive the second pairing request message which is sent by the first radio frequency device and contains the button information corresponding to the button instruction entered by the user according to the interface information.

14. The radio frequency device according to claim 12, further comprising:
a judging unit, configured to, after the first paring request receiving unit receives the first pairing request message sent by the first radio frequency device, judge whether the radio frequency device stores pairing information of the first radio frequency device.

15. The radio frequency device according to claim 14, wherein
the second pairing response returning unit is further configured to, when the judging unit judges that the radio frequency device stores the pairing information of the first radio frequency device, return, to the first radio frequency device, the second pairing response message which contains the confirmation result, wherein the confirmation result indicates that the pairing process succeeds;
the key exchanging unit is further configured to, after the second pairing response returning unit returns the second pairing response message which contains the confirmation result indicating that the pairing process succeeds, exchange the keys with the first radio frequency device, and prompt the user end that the pairing process succeeds; and
the displaying unit is further configured to, when the judging unit judges that the radio frequency device does not store the pairing information of the first radio frequency device, display the interface information.

16. A non-transitory computer-readable storage medium having a computer program code which, when executed by a hardware processor causes the hardware processor to execute the following:
after a paring instruction entered by a user is received, sending a discovery request message to at least one second radio frequency device;
receiving a discovery response message returned by the at least one second radio frequency device;
sending a first pairing request message which meets requirements of Radio Frequency for Consumer Electronics (RF4CE) standard, to a target second radio frequency device in the at least one second radio frequency device;
receiving a first paring response message which meets the requirements of the RF4CE standard, returned by the target second radio frequency device;
after a button instruction entered by the user according to interface information displayed by the target second radio frequency device is received, sending a second paring request message which meets the requirements of the RF4CE standard, to the target second radio frequency device, wherein the second pairing request message contains button information corresponding to the button instruction, and the interface information is prompt information that gives a prompt about a button required to be entered by the user; and
receiving a second pairing response message which meets the requirements of the RF4CE standard, and is returned by the target second radio frequency device and contains a confirmation result; and if the confirmation result indicates that the button information and the interface information are successfully matched, exchanging keys with the target second radio frequency device, thereby completing pairing with the target second radio frequency device.

\* \* \* \* \*

UNITED STATES PATENT AND TRADEMARK OFFICE
CERTIFICATE OF CORRECTION

| | | |
|---|---|---|
| PATENT NO. | : 9,059,775 B2 | Page 1 of 1 |
| APPLICATION NO. | : 13/727287 | |
| DATED | : June 16, 2015 | |
| INVENTOR(S) | : Qin et al. | |

It is certified that error appears in the above-identified patent and that said Letters Patent is hereby corrected as shown below:

IN THE CLAIMS

Column 17, line 15, "first paring" should read -- first pairing --.

Column 17, line 18, "first paring" should read -- first pairing --.

Column 18, line 24, "second paring" should read -- second pairing --.

Signed and Sealed this
Twenty-second Day of December, 2015

Michelle K. Lee
*Director of the United States Patent and Trademark Office*